US008604971B2

(12) United States Patent
Apostolos et al.

(10) Patent No.: US 8,604,971 B2
(45) Date of Patent: Dec. 10, 2013

(54) SCANNING NEAR FIELD ELECTROMAGNETIC PROBE

(75) Inventors: John T. Apostolos, Lyndeborough, NH (US); Richard J. Millard, Bedford, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 464 days.

(21) Appl. No.: 12/628,385

(22) Filed: Dec. 1, 2009
(Under 37 CFR 1.47)

(65) Prior Publication Data

US 2011/0128179 A1    Jun. 2, 2011

(51) Int. Cl.
*G01S 13/32* (2006.01)
*G01S 13/04* (2006.01)
*G01S 13/89* (2006.01)
*G01S 13/00* (2006.01)

(52) U.S. Cl.
USPC ............. 342/129; 342/22; 342/27; 342/89; 342/90; 342/118; 342/128; 342/145; 342/175; 342/176; 342/179; 342/195

(58) Field of Classification Search
USPC ............ 382/100, 103, 109; 342/21, 22, 342/25 R–25 F, 27, 28, 89–103, 118, 342/127–135, 137, 175, 176, 179, 192–197, 342/42, 44, 45, 146, 147, 149, 150, 159, 342/145; 701/1, 300, 301
See application file for complete search history.

(56) References Cited

U.S. PATENT DOCUMENTS

| | | | | |
|---|---|---|---|---|
| 1,564,940 A | * | 12/1925 | Chapman | 342/147 |
| 3,351,936 A | * | 11/1967 | Feder | 342/22 |
| 3,562,642 A | * | 2/1971 | Hochschild | 342/22 |
| 3,719,947 A | * | 3/1973 | Gutton et al. | 342/22 |
| 3,745,575 A | * | 7/1973 | Kikuchi | 342/22 |
| 3,775,765 A | * | 11/1973 | Di Piazza et al. | 342/22 |
| 3,831,173 A | * | 8/1974 | Lerner | 342/22 |
| 3,967,282 A | * | 6/1976 | Young et al. | 342/22 |
| 4,062,010 A | * | 12/1977 | Young et al. | 342/21 |
| 4,126,860 A | * | 11/1978 | Sullivan et al. | 342/21 |
| 4,583,095 A | * | 4/1986 | Peterson | 342/22 |
| 4,698,634 A | * | 10/1987 | Alongi et al. | 342/22 |
| 4,706,031 A | * | 11/1987 | Michiguchi et al. | 342/22 |
| 4,743,906 A | * | 5/1988 | Fullerton | 342/27 |
| 5,018,218 A | * | 5/1991 | Peregrim et al. | 382/103 |
| 5,150,099 A | * | 9/1992 | Lienau | 342/27 |
| 5,325,095 A | * | 6/1994 | Vadnais et al. | 342/22 |
| 5,339,080 A | * | 8/1994 | Steinway et al. | 342/22 |
| 5,357,253 A | * | 10/1994 | Van Etten et al. | 342/22 |
| 5,424,742 A | * | 6/1995 | Long et al. | 342/25 C |
| 5,430,445 A | * | 7/1995 | Peregrim et al. | 342/25 C |
| 5,446,461 A | * | 8/1995 | Frazier | 342/22 |
| 5,541,605 A | * | 7/1996 | Heger | 342/22 |
| 5,592,170 A | * | 1/1997 | Price et al. | 342/22 |
| 5,798,728 A | * | 8/1998 | Tomishima et al. | 342/159 |

(Continued)

*Primary Examiner* — Bernarr Gregory
(74) *Attorney, Agent, or Firm* — Daniel J. Long; Robert K. Tendler (57) ABSTRACT

A method and apparatus is devised for detecting objects of interest in which frequency-scanned RF in the HF region of the electromagnetic spectrum is projected out across a given area and returns are detected and converted into image data in which phase, amplitude, range and frequency associated with the incoming data is correlated with frequency-dependent range templates to determine the existence of, the range of and the direction of the objects of interest.

19 Claims, 9 Drawing Sheets

(56) References Cited

U.S. PATENT DOCUMENTS

| | | | |
|---|---|---|---|
| 5,867,117 A * | 2/1999 | Gogineni et al. | 342/22 |
| 5,986,602 A * | 11/1999 | Frink | 342/127 |
| 6,067,043 A * | 5/2000 | Faure et al. | 342/135 |
| 6,094,157 A * | 7/2000 | Cowdrick | 342/22 |
| 6,157,875 A * | 12/2000 | Hedman et al. | 701/1 |
| 6,222,481 B1 * | 4/2001 | Abrahamson et al. | 342/90 |
| 6,225,941 B1 * | 5/2001 | Gogineni et al. | 342/22 |
| 6,313,785 B1 * | 11/2001 | Mattox | 342/192 |
| 6,359,582 B1 * | 3/2002 | MacAleese et al. | 342/22 |
| 6,437,729 B1 * | 8/2002 | Mattox | 342/195 |
| 6,473,025 B2 * | 10/2002 | Stolarczyk et al. | 342/22 |
| 6,501,414 B2 * | 12/2002 | Arndt et al. | 342/22 |
| 6,522,285 B2 * | 2/2003 | Stolarczyk et al. | 342/22 |
| 6,603,423 B2 * | 8/2003 | Klausing et al. | 342/25 R |
| 6,633,252 B2 * | 10/2003 | Stolarczyk et al. | 342/22 |
| 6,762,712 B2 * | 7/2004 | Kim | 342/135 |
| 6,847,894 B1 * | 1/2005 | Hasegawa | 701/301 |
| 6,873,912 B2 * | 3/2005 | Shimomura | 701/301 |
| 6,914,552 B1 * | 7/2005 | McEwan | 342/22 |
| 6,937,639 B2 * | 8/2005 | Pendergrass et al. | 342/44 |
| 6,965,341 B1 * | 11/2005 | Cho et al. | 342/25 A |
| 7,190,302 B2 * | 3/2007 | Biggs | 342/22 |
| 7,295,149 B1 * | 11/2007 | Wolf | 342/90 |
| 7,298,312 B2 * | 11/2007 | McLemore | 342/45 |
| 7,307,575 B2 * | 12/2007 | Zemany | 342/22 |
| 7,436,909 B2 * | 10/2008 | Sahinoglu et al. | 342/150 |
| 7,460,052 B2 * | 12/2008 | Zemany et al. | 342/22 |
| 7,570,200 B2 * | 8/2009 | Niedzwiecki | 342/175 |
| 7,656,342 B2 * | 2/2010 | Stolarczyk et al. | 342/22 |
| 7,659,847 B2 * | 2/2010 | Bausov et al. | 342/22 |
| 7,920,088 B2 * | 4/2011 | Thompson et al. | 342/90 |
| 7,936,301 B2 * | 5/2011 | Niedzwiecki | 342/146 |
| 7,990,310 B2 * | 8/2011 | Kwak et al. | 342/118 |
| 2005/0122218 A1 * | 6/2005 | Goggin | 342/118 |
| 2006/0290563 A1 * | 12/2006 | McLemore | 342/45 |

* cited by examiner

SCANNING NEAR FIELD ELECTROMAGNETIC PROBE

FIELD OF THE INVENTION

This invention relates to a system for detecting electrically conductive or other structures and more particularly to impedance sensing and the utilization of range templates to detect the existence of and the range to the structures.

BACKGROUND OF THE INVENTION

While there are various systems for detecting subterranean structures such as for instance ground-penetrating radars, there nonetheless exists a need to detect such structures at a distance without having to be directly over the structures and project radio waves into the ground.

What this means is that some subterranean structures such as wire, cable or pipes of varying size are objects which one would like to know the existence of, length of and orientation of without having to be right on top of them. These objects exist in urban environments. It is noted that the detection of such objects at a distance, for instance at 100 meters, presents significant problems.

It would be useful to be able to aerial-survey an area to detect such objects, in which the objects in general are of varying size, permeability and dielectric constant.

These objects include mineral deposits buried beneath the earth and can include objects inside buildings as well as moving objects such as personnel within the buildings themselves.

SUMMARY OF INVENTION

The existence of, length and range to a sensed structure or object is detected through a resonance technique involving measuring impedances, in which frequency swept energy in the HF band, typically from 1.5 to 20 megahertz, is projected towards a given area and radiation returned from the area is analyzed. The transmitter used in one embodiment steps its output from 1.5 megahertz to 20 megahertz in 50 kilohertz frequency bins or steps. The returns from the exposed area are monitored using a near field scanning sensor operating in the HF band in which in its simplest implementation involves a single high Q switchable antenna which acts as an electromagnetic probe, for instance mounted on a ground-based vehicle or aerial vehicle. As the vehicle travels in a given direction, the probe collects mutual impedance data between it and the surrounding infrastructure. This data is converted to an image in which amplitude and phase are correlated with range to provide a range profile at each of the stepped frequencies.

It has been found that there is a near field region about 300 meters in diameter where fields are highly inhomogeneous. This inhomogeneity gives rise to unique features associated with the geometries of the objects of interest. One object of interest is a subterranean conductive structure such as a wire, cable or pipe. In one embodiment, the returns from a wire are analyzed in terms of frequency, phase and range, with range-correlated images being generated for each frequency bin.

The area under surveillance is previously mapped to provide frequency-dependent range-correlated image templates (range templates) which are arranged in increased frequency steps. The range-correlated images generated during the sensing are correlated against range templates, each one of the range templates being associated with a given structure and a given orientation of the structure relative to for instance, direction of travel of the vehicle carrying the antenna or antennas.

Upon correlation between the images formed from the returns and the range templates stored as a result of the survey, the stored template most closely matching the image formed from the returns is returned to describe both the existence of a wire, its length, and its range.

One way to describe the subject invention is that it is similar to synthetic aperture radars in which images of the infrastructure are gathered as a vehicle proceeds. There is a near field region about 300 meters in diameter where the fields are highly inhomogeneous and 2-D images with range as one axis and frequency as the other are formed as the vehicle proceeds. The image contains pixels that constitute complex aggregate mutual impedances, or in this case having frequency, phase, amplitude and range attributes.

In one embodiment an S-parameter receiver, in essence a network analyzer, detects the incoming signal and generates a complex reflection coefficient S-11 value that is coupled to a frequency/range image generator, which is in turn coupled to an image processor. This image processor generates an image in which range is mapped with respect to frequency, phase and amplitude of the incoming signal. The amplitude and phase responses with frequency are combined into a range-dependant image, with the range dependant image correlated with surveyed and stored templates, each one designating a structure of a predetermined length and a predetermined orientation for a predetermined range. Correlation of the two images provides the identity of the stored range template which most closely correlates to the sensed data, thereby to identify 1) the existence of the structure, 2) the length of the structure, and 3) the range to the structure.

In one embodiment, 370×150 pixel template images of objects of interest are generated and incorporated into the system. Incoming data is continuously correlated against the library of objects of interest in real time. While the subject invention has been described in terms of wires and electrically conductive cables and pipes, other objects of interest having characteristic complex permeability and dielectric constants are within the scope of this invention. This includes both electrically conductive objects, mineral deposits and even people moving within a building.

In one embodiment, a Greens function-like template is used to "map" the city or town. Clutter rejection is possible by comparing or subtracting previously taken data along the same route. The above is particularly attractive since changes in the environment provide important clues as to the current situation.

Experiments have shown that with an output power of 1 milliwatt and a coherent integration time of 750 milliseconds, a 150 foot piece of wire lying on the ground at a range of 100 meters with medium urban/atmospheric daytime noise is detectable with a signal-to-noise ratio of 50 dB at 3.0 MHz. Although there is copious energy available, the effect of clutter from surrounding infrastructure can present problems. If however the images of interest are very different from the clutter, then the correlation pattern recognition is effective to determine an object of interest, namely the existence of a wire. Note that finite difference or gradient sampling is well suited to the subject invention since the near field used to scan the object of interest is rapidly changing.

In one embodiment, in order to detect the resonance associated with a wire or cable the frequency is stepped from 1.5 megahertz in 40 steps. With each step the antenna used for the transmission or receipt of the return signals is appropriately tuned.

A single antenna is used in one embodiment for both transmitting and receiving, requiring an S-11 receiver.

When utilizing a second antenna as a receive antenna, the receiver is an S-21 mode receiver, with the subject system looking at the transfer function between the two antennas. Here the transfer function changes in the presence of a wire such that the wire is detectable, even though the wire may be 100 feet ahead of the two antennas.

Thus, with a single antenna and the receiver operating in the S-11 mode, amplitude, phase, frequency and range are measured in terms of the signal returned at the sole antenna.

In the S-21 mode utilizing a transmit antenna and a receive antenna, what is measured is the transfer function between the transmit antenna and the receive antenna.

If for instance the half-wave resonance wavelength is 500 feet, one typically has an antenna length for a half-wave antenna of 160 meters or about 250 feet. With a 500 foot long length of wire, one would see a response at about 900 kilohertz. If there is a half-wave resonance at 900 kilohertz, there will also be a three half-wave resonance at 2700 kilohertz, etc. Thus when one is sweeping through the frequencies in either the S-11 or S-21 mode, one will see resonant peaks at one half-wave length, three half-wave lengths, or five half-wave lengths. One might also see peaks at one wavelength as well as both odd and even harmonics depending on how the wire is configured.

It is noted that there will be peaks in amplitude at given ranges. There will also be phase peaks in terms of the phase function for the difference in phase between the outgoing signal and the reflected signal. Note that the progression of the phase will be different for different frequencies, different resonances and different ranges. It has thus been found that phase is a function of range for different frequencies, enabling one to template out the effect.

Note also that with respect to amplitude, amplitude will increase in a certain manner characteristic of attenuation along the ground so that another way of obtaining range is to measure amplitude.

What has been found is that for both amplitude and phase there is a characteristic that is a function of range. Thus, the range information in both the amplitude and phase domains can be used simultaneously to obtain range.

Moreover when using the S-21 receiver and two antennas, one can determine to which side of a road the structure extends. By appropriate phasing of the two antennas one can provide null and non-null directions. Thus, if there is a return from a non-null direction it can be ascertained to which side of the line of travel the structure is running.

As will be appreciated, in the S-11 mode one is looking to analyze the complex reflection coefficient. The complex reflection coefficient is a result of looking at the reflected power from a load or from an antenna. As the antenna approaches an object the reflected power starts to change and by monitoring the reflected power one can sense the object in a rather sensitive manner.

Thus in the S-11 mode, one is looking for changes in reflected power in terms of phase and amplitude over frequency correlated with range.

In the S-21 mode, since one is looking for changes in the energy that are picked up versus that which is transmitted, the changes are measured in terms of the transfer function between the two antennas.

In one embodiment where the lowest operating frequency is 1.5 megahertz, the antennas can take the form of large coils which are tapped for tuning purposes, with the taps being set by relays or electronic switches that are tracking the transmit frequency.

In summary, a method and apparatus is devised for detecting subterranean or other objects of interest in which frequency-scanned RF in the HF region of the electromagnetic spectrum is projected out across a given area and returns are detected and converted into image data in which phase, amplitude, range and frequency associated with the incoming data is correlated with frequency-dependent range templates to determine the existence of, the range of and the direction of objects of interest.

BRIEF DESCRIPTION OF THE DRAWINGS

These and other features of the subject invention will be better understood in connection with the Detailed Description, in conjunction with the Drawings, of which.

DETAILED DESCRIPTION

Figure 1:
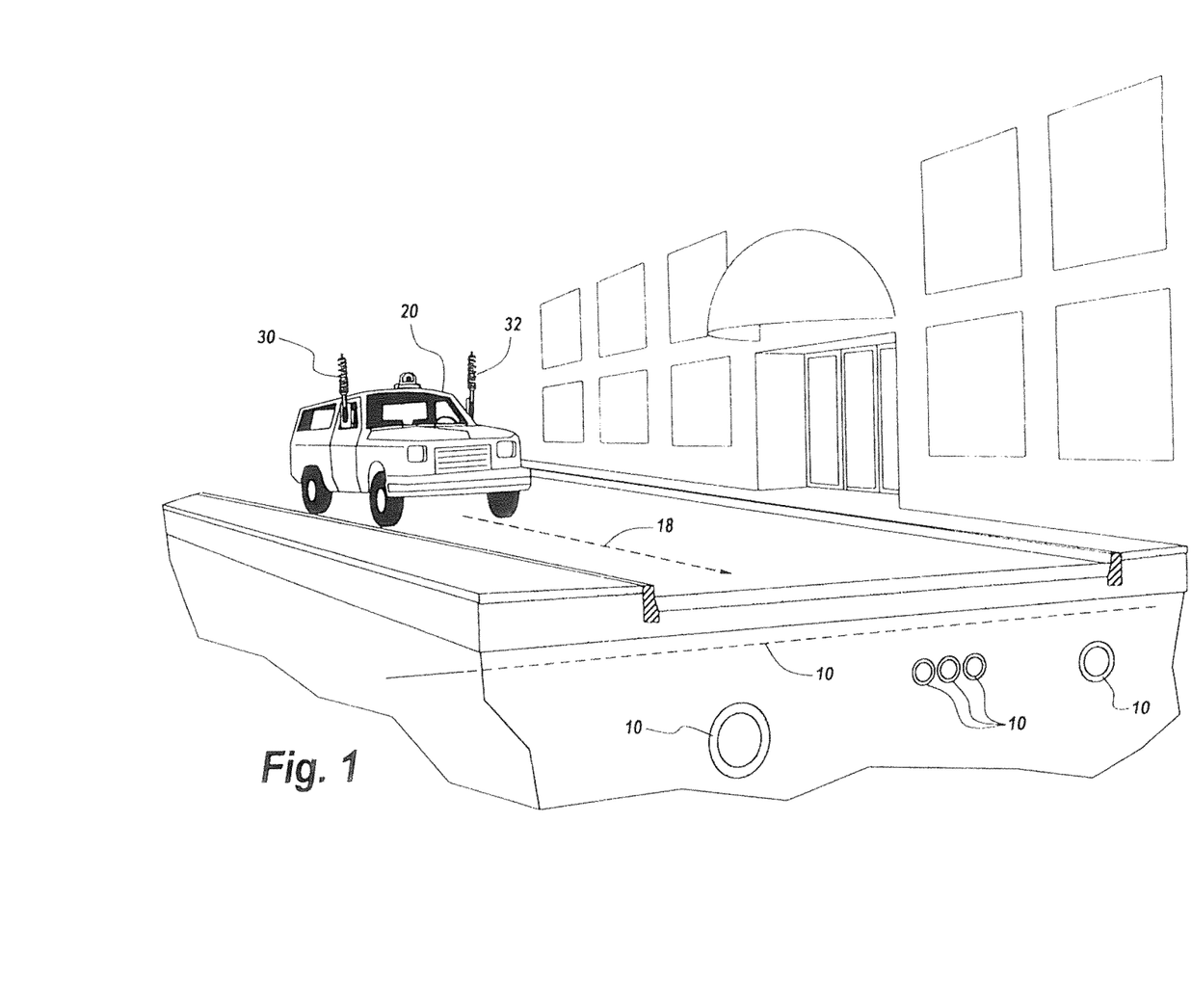
FIG. 1 is a diagrammatic illustration of a subterranean structure such as a wire, cable or pipe, the existence, location and orientation of which is to be detected.

Referring now to FIG. 1, a conductive structure 10 such as a wire, cable or pipe is located beneath a road 12 in an urban environment.

In one embodiment, structure 10 is embedded along the direction of travel 18 of a vehicle 20 having a pair of probes 30 and 32. It is the purpose of the subject invention to detect such structures or objects.

Figure 2:
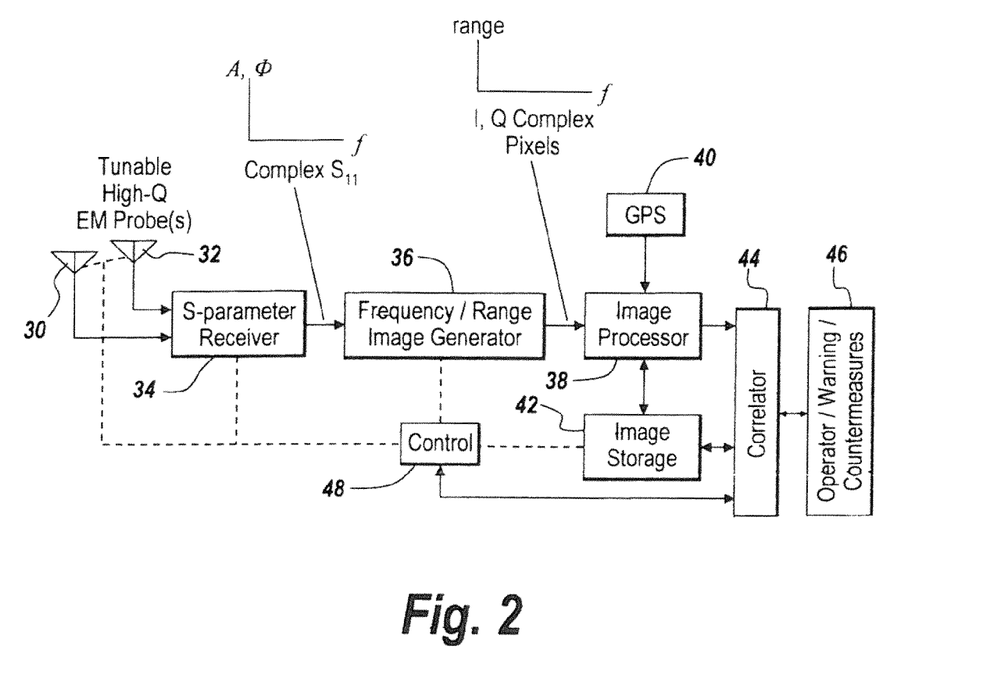
FIG. 2 is a block diagram of a scanning near-field electromagnetic probe in which tunable high Q electromagnetic probes are coupled to a receiver that outputs a signal applied to a frequency/range image generator, the outputs of which are compared in an image processor to stored images to derive the correlation between the data associated with the measurement and the stored images, thus to provide the identity of, the existence of and the range of an object of interest.

In order to provide such detection in one embodiment, and as illustrated in FIG. 2, a pair of tunable high Q electromagnetic probes 30 and 32, one embodiment in the form of HF coil antennas, are coupled to an S-parameter receiver 34, the output of which is the unitless complex reflection coefficient S-11, namely involving amplitude, phase and frequency. The heart of the S parameter receiver is a network analyzer. Either S11 or S12 modes may be used. S11 requires just one probe while S12 requires two probes. The probes are switch tunable high Q antennas. The idea of the S11 mode is to sample the mutual impedance of the probe to objects in the near field. The idea of the S12 mode is to sample the transfer function between the two probes in the presence of objects in the near field.

Critical to the sensitivity of the S parameter receiver is the use of a set of reference data at all the frequencies involved. In the initialization phase, each time the receiver is turned on, the system is positioned in a near field object free zone and S11 or S12 data is taken over all frequencies. This set of data is used as a reference such that the working output of the receiver is S11-S11 (ref) or S12-S12 (ref). Thus if the system is initialized and operation is started in the near field object free zone, the output of the receiver is zero. This type of operation gives equivalent performance to a receiver with a low noise figure, dependent upon the accuracy of the above subtraction. When an A/D converter is used, the subtraction is done after the A/D converter so that the noise figure and dynamic range are limited by the number of bits. An alternative mode of operation, useful when the system is installed on a moving vehicle; is the differential mode. The differential mode subtracts sequential pairs of data sets. This mode looks for differences in S11 or S12 as the vehicle progresses. The differential mode requires no absolute reference set.

In the subject invention amplitude, phase and frequency are correlated with range. This means that for each range an image can be generated, the pixels of which reflect amplitude, phase and frequency.

To this end the output of the S-parameter receiver is coupled to a frequency/range image generator 36 which provides an image comprised of I, Q complex pixels in which for each frequency there is a range image, with the pixel intensities indicating amplitude and phase of the signal returned from the scene.

The images are coupled to an image processor 38, in one embodiment provided with the position of the probe from a GPS unit 40. The image from the realtime data is compared or correlated with stored image data at 42 comprising templates that are the result of a survey of the area in question. In one embodiment, the survey for detection of a wire includes amplitude, phase and frequency for various ranges of various length wires in various orientations with respect to the path of a vehicle.

The image processor output is correlated with the stored images at correlator 44, with a correlation being output at 46 to apprise the operator of the vehicle that a wire exists, its range and its direction.

Note that a control 48 controls the tuning of the high Q EM probes 30 and 32, as well as the stepped frequency transmission of the electromagnetic energy projected into the scene by the transmitter utilized.

Figure 3:
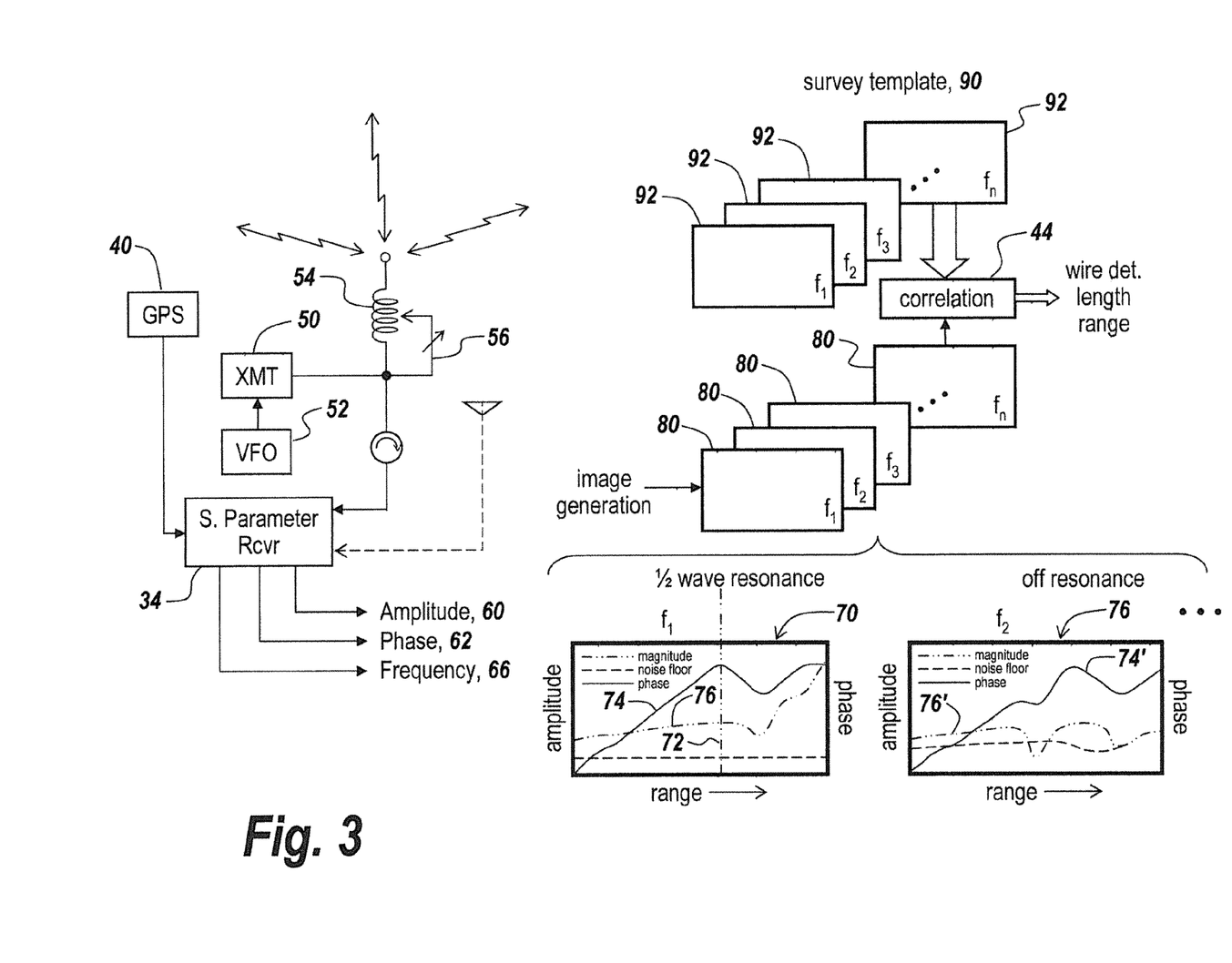
FIG. 3 is a diagrammatic illustration of the subject system in which transmitted energy is received and an S-parameter receiver is employed to output amplitude, phase and frequency of the returned signal graphed against range in which wire resonance is determined both by amplitude, phase and frequency with respect to range, with the image compared or correlated with survey templates to ascertain the existence of a wire, and the length of and range to the wire.

Referring to FIG. 3, it can be seen that a transmitter 50 is frequency swept by a variable frequency oscillator 52 to project energy out from a tuned antenna 54 into the probe environment. The antenna is tuned as illustrated by 56 to be resonant at the requisite stepped frequency bins, thereby providing extremely good sensitivity across the stepped frequency range.

GPS 40 is coupled to S-parameter receiver 34 which detects returns from the scene and outputs amplitude 60, phase 62 and frequency 66 that are utilized to generate the images described above.

As can be seen at graph 70, a half-wave phase resonance plot at frequency $f_1$ is shown by dotted line 72, with the plotted phase defined by the phase of the outgoing signal compared to the phase of the reflected signal. It will be seen that the phase plot at half-wave resonance has the characteristic shown at 74 for a wire of a particular length and orientation versus range.

Graph 70 also shows an amplitude plot 76 that has a particular shape for the one-half wave resonance that is peculiar to a wire of a particular length and orientation versus range.

As shown at 76' for an off-resonance graph, the amplitude plot takes on quite a different configuration as does the phase plot 74' indicating at least in these two graphs that there is a substantial difference between the one-half wavelength resonance response of the system and the off-resonance response.

As seen, images 80 are generated for frequencies $f_1$, $f_2$, $f_3 \ldots f_n$ in which the images are composed of pixels having densities corresponding to a combination of phase and amplitude versus range for each frequency. These images therefore characterize the response of the sensing system for the stepped frequency bins involved.

Survey templates 90 involve range templates 92 for the frequencies $f_1$, $f_2$, $f_3 \ldots f_n$ which are utilized to model the returns from a given length wire at a given orientation with respect to the line of travel of the vehicle. These templates are used in a correlation process carried out by correlator 44, with the closest correlation defining that survey template to which the incoming data most closely approximates. This identifies the existence of a wire, the length of the wire and the range of the wire, as well as its direction when multiple phased antennas are used.

Figure 4:
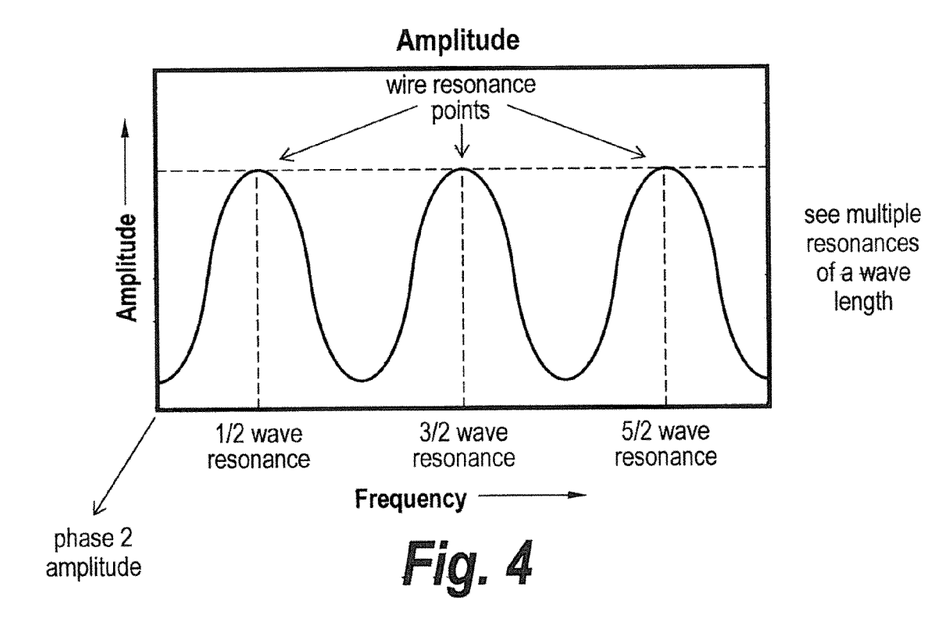
FIG. 4 is a graph of amplitude versus frequency indicating wire resonance points at the one half-wave resonance, the three half-wave resonance and the five half-wave resonance frequencies.

Referring to FIG. 4, the graph shows amplitude versus frequency for a given length wire and shows that there are amplitude peaks at the one-half wave resonance, three-half wave resonance and five-half wave resonance for the particular wire. Thus, there are different resonance characteristics associated with the detected wire.

It will be seen that these resonances are equally spaced in a pattern which is highly recognizable and at the very least specifies the length of the wire.

Figure 5:
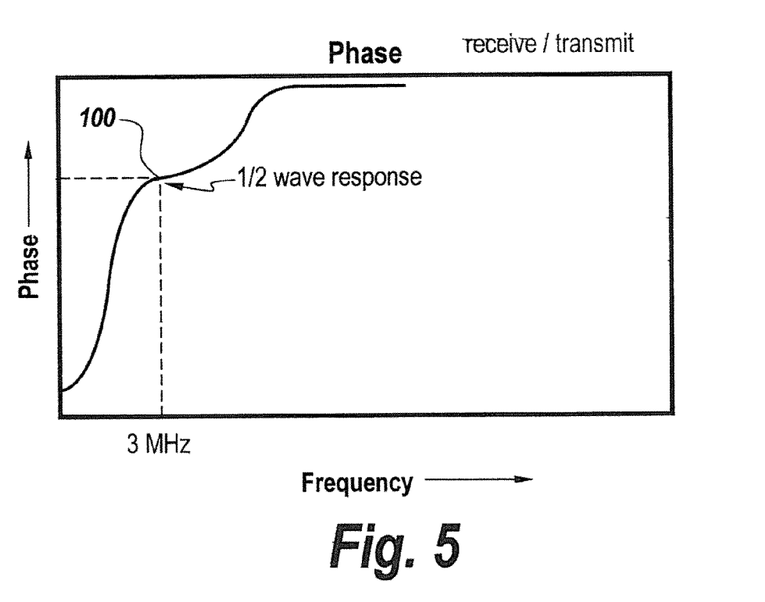
FIG. 5 is a graph of phase versus frequency showing a one half-wave inflection in the phase plot indicating the presence of a wire.

In terms of phase, and referring now to FIG. 5, the phase of the incoming signal versus the phase of the outgoing signal is plotted with respect to frequency, with an inflection 100 occurring at the one-half wavelength responses, here shown at 3 MHz.

From FIGS. 4 and 5 it will be appreciated that the resonance characteristic associated with a wire can be sensed both in amplitude and phase which, for a given range are uniquely determinative of the range of the wire from the sensing head.

Figure 6:
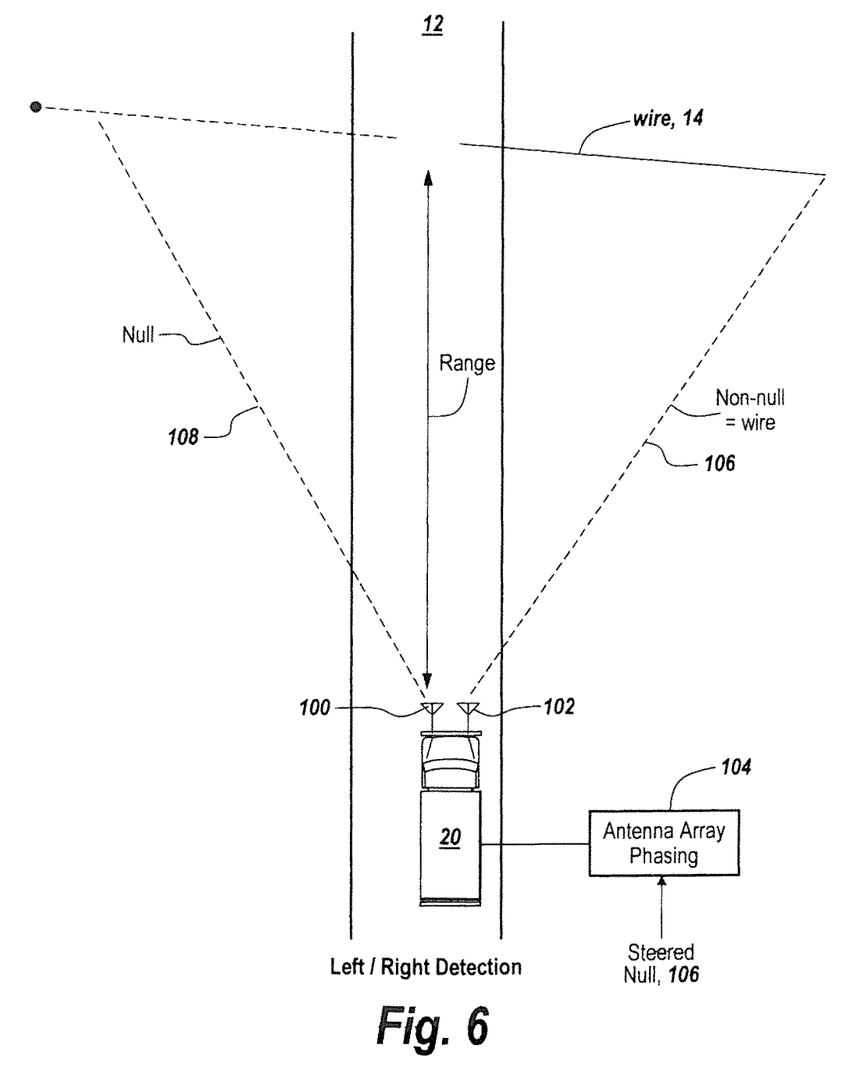
FIG. 6 is a diagrammatic illustration of the utilization of a phased antenna array on a vehicle for left/right detection of the direction of a wire extending from the middle of a roadway in which a non-null response along a line to the right of the roadway indicates the direction in which a wire is running.

Referring to FIG. 6, if a vehicle 20 is provided with phased array antennas 100 and 102, assuming an antenna array phasing module 104 is employed to steer the array, and assuming that there is a null which can be steered across the scene where wire 10 exists, it will be appreciated that if there is a response at a non-null direction 106, it will mean that the wire exists to the right of roadway 12, whereas if there is no response when the beam is directed in its null direction as illustrated at 108, then the right/left direction of the wire is determinable.

Figure 7:
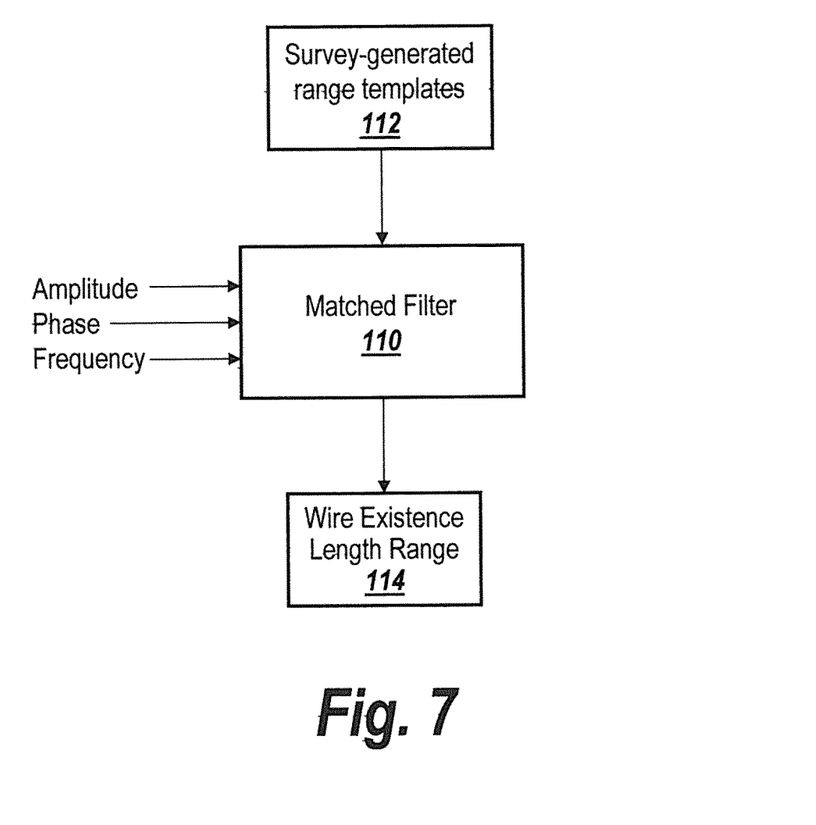
FIG. 7 is a block diagram of the utilization of amplitude, phase, frequency and range matched with the same parameters for survey-generated range templates to provide for the detection of a wire, its length and range.

Referring to FIG. 7, the subject system can be characterized by a matched filter 110 utilized to correlate the detected data to survey-generated range templates, with the wire existence, length and range being outputted as illustrated at 114.

Figure 8:
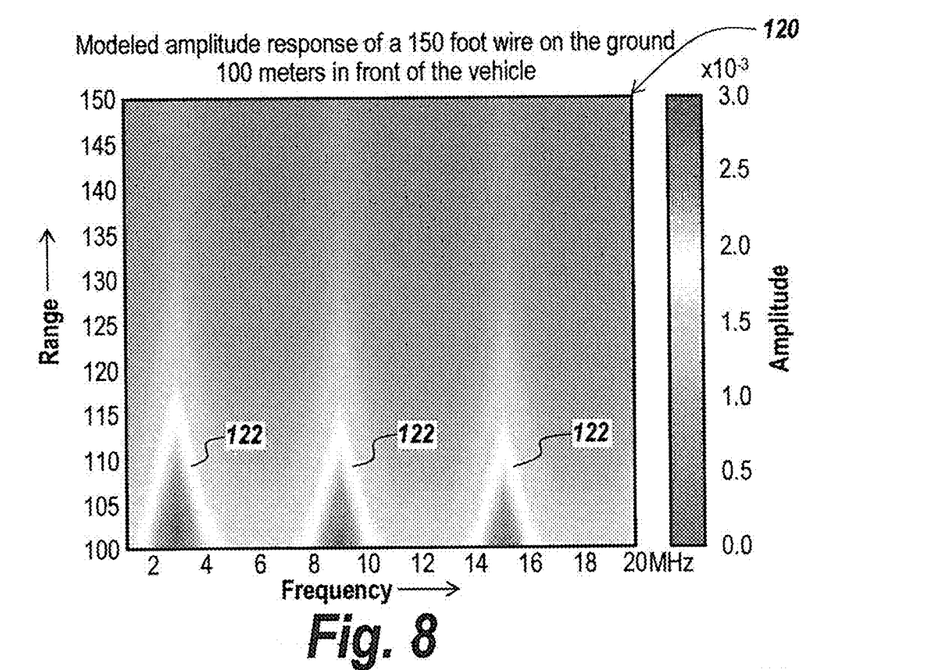
FIG. 8 is an image generated from wire reflections in which frequency is plotted against range, with the density of the pixels indicating amplitude showing the resonant response at 3 MHz, 9 MHz and 15 MHz indicating resonance characteristics associated with the existence of a 150 foot wire on the ground at 100 meters in front of a vehicle.

The amplitude sensitivity of the subject system is illustrated in FIG. 8. Here in an image 120 in which frequency is graphed against range exhibits pixels having amplitudes 122 that appear to be regularly spaced along the frequency axis. This regular spacing indicates the amplitude resonance characteristic of the returned signal in which the resonances are highly recognizable.

Figure 9:
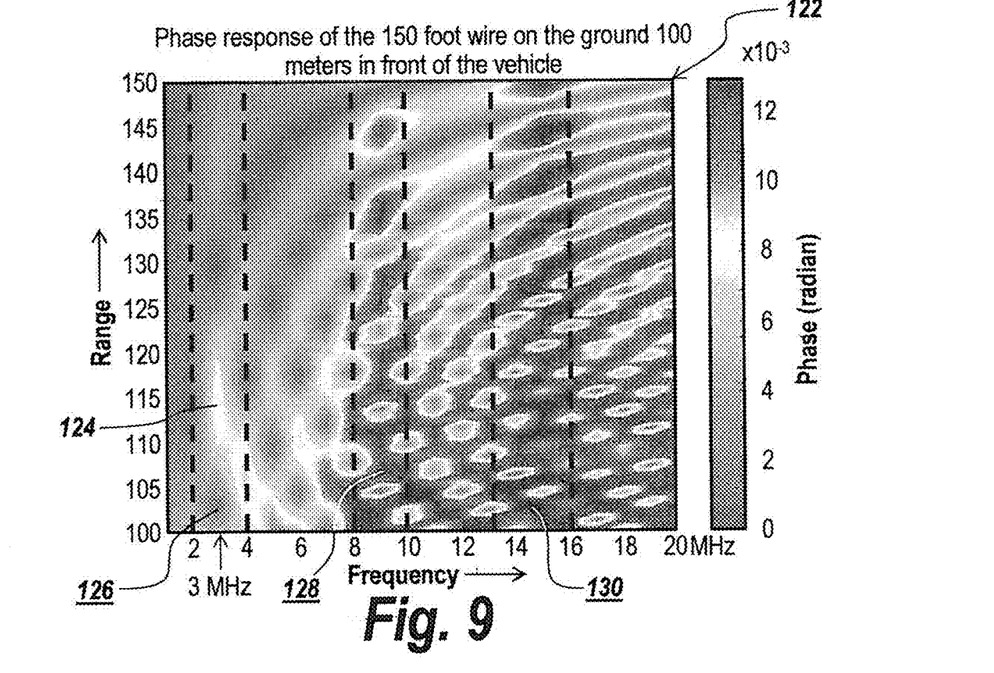
FIG. 9 is an image generated from wire reflections indicating a phase inflection response at 3 MHz corresponding to the phase response to the presence of a 150 foot wire on the ground 100 meters in front of a vehicle.

Referring to FIG. 9, the phase response of the subject system is shown. Here, frequency is graphed against range, with the pixel densities indicating the phase angle. Note there is a recognizable phase response 124 which lies within the half-wavelength band 126. While the phase relationships in the three-half wavelength resonance band 128 or the five-half wavelength resonance band 130 are not so highly recognizable, by correlation with the aforementioned templates recognizable patterns for the phase-related resonance effects of the wire can be ascertained. Note that the darkening of the pixels in bands 128 and 130 indicates phase inflections associated with higher resonances.

Figure 10:
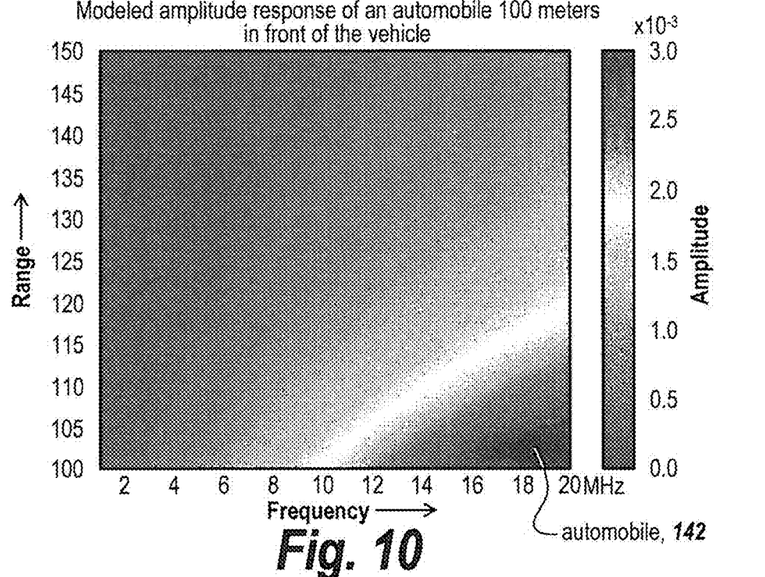
FIG. 10 is an image of the response of the subject system to an automobile, showing the modeled amplitude response of an automobile at 100 meters in front of a vehicle.

Referring to FIG. 10, image 140 indicates the modeled amplitude resonance of an automobile at 100 meters in front of a vehicle, in which the detected response is a smeared out increase in amplitude for the pixels shown in area 142.

Figure 11:
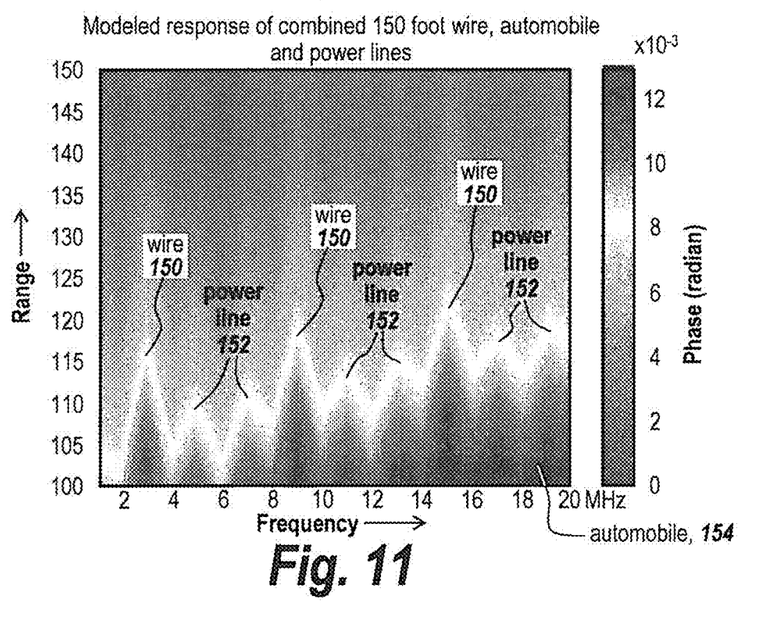
FIG. 11 is an image of the combined 150 foot wire, automobile and power line response, illustrating amplitude peaks at the one-half, three-half and five-half wavelengths, with the automotive response indicated as a smeared-out area to the bottom right of the image and with power line responses having a different periodicity.

Referring to FIG. 11, when one considers the amplitude response of a wire, here illustrated at 150, one can see the regular amplitude resonances for a wire which have a different periodicity than for instance power lines having resonance peaks 152.

Also noted is the increased density of the pixels representing the presence of a automobile. These appear in the lower right hand side of the image as illustrated at 154.

Figure 12:
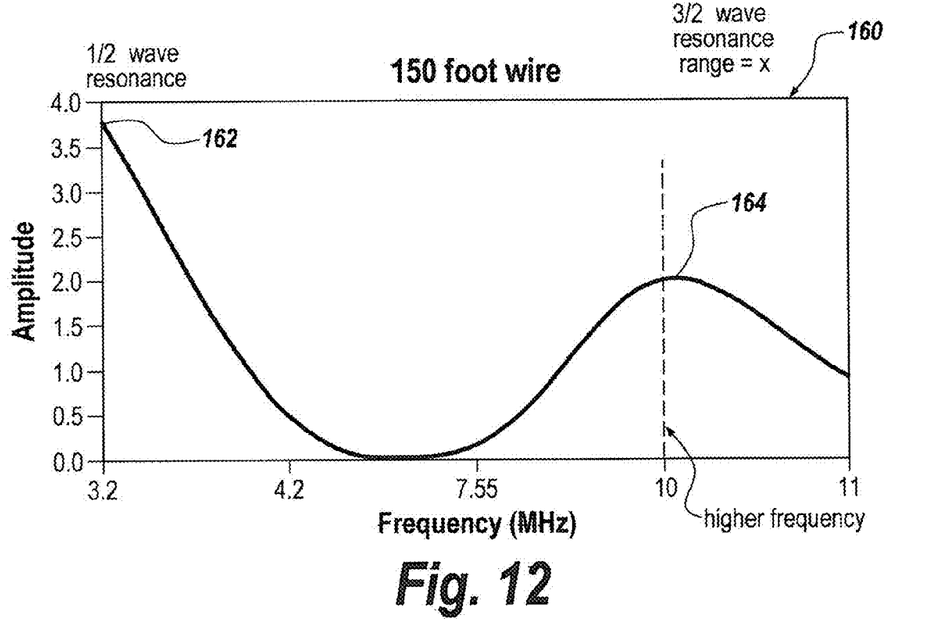
FIG. 12 is a graph of frequency versus amplitude for a 150 foot wire at a predetermined range showing a one-half wave resonance at 3.2 MHz and a second three-half wavelength resonance at 9 MHz; and, FIG. 13 is a graph of amplitude versus frequency for a 300 foot wire at the predetermined range of FIG. 12, indicating a three-half wavelength resonance at approximately 5.5 MHz.
Figure 13:
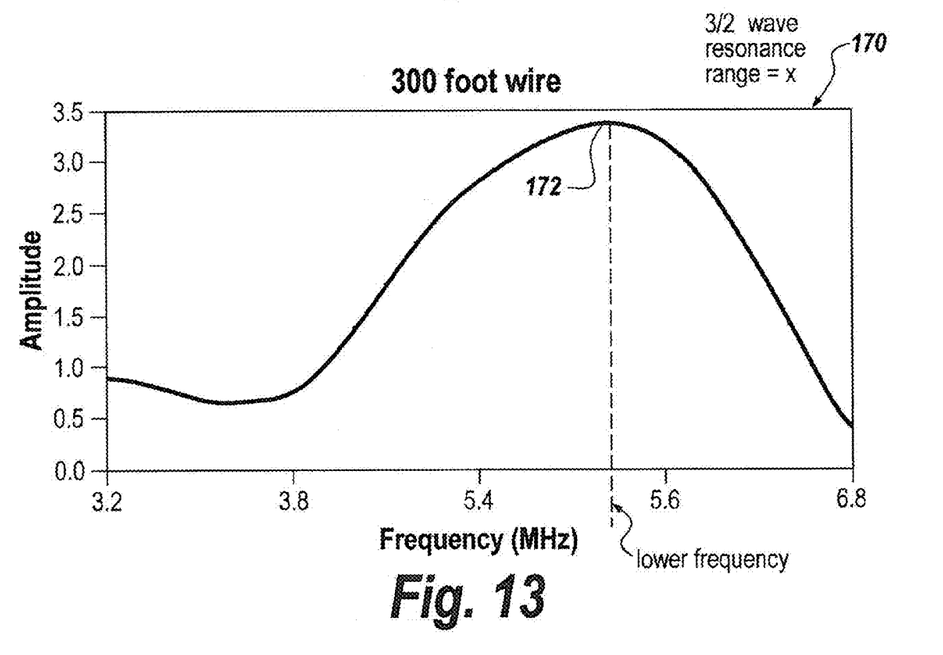

Referring now to FIGS. 12 and 13, amplitude, is graphed against frequency for a 150 foot wire and a 300 foot wire. As can be seen from FIG. 12, graph 160 shows amplitude resonances for the 150 foot wire at 162 and 164, corresponding to the half and three-half wave resonances for the 150 foot wire. When detecting a 300 foot wire at the same range, as illustrated by graph 170 there is a one-half resonance peak at 172. This confirms that the length of the wire determines the resonance characteristics and that the resonances are detectable by the subject technique.

While the subject invention has been described in terms of detecting a wire, it can be used to detect all manner of objects that have a characteristic signature to energy returned to the probe.

It can therefore be seen that the subject system has a uniquely sensitive response for detecting resonances due to the presence of an object exhibiting a characteristic permeability and dielectric coefficient, given the correlation process in which range templates are compared with realtime data.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for detecting the presence of an object, comprising the steps of:
    generating a number of range templates, each for a different radio frequency and each containing phase and amplitude information pertaining to a number of objects of a number of lengths in a number of orientations;
    transmitting stepped radio frequency signals from a probe towards a predetermined area;
    detecting the amplitude and phase of energy reflected back to the probe;
    generating an image of the returned energy from the probe for each frequency of the probe transmission, the image including a range axis and an orthogonal amplitude/phase set of axes for each of the stepped frequencies; and,
    correlating the image formed at the each of the stepped frequencies to the stored range templates, with a high correlation to one of the surveyed templates indicated by the identity of the existence of the object, the length of the object and the range of the object to the probe.

2. The method of claim 1, wherein the energy is projected to the area utilizes a transmitter having a variable frequency output stepped in accordance with a predetermined number of frequency bins.

3. The method of claim 2, wherein the swept frequency range is in the HF frequency band.

4. The method of claim 3, wherein the number of steps in the stepped frequency band are between 30 and 50.

5. The method of claim 1, wherein the transmitting step includes a transmitter coupled to a transmitting probe antenna and wherein returned signals are received at a separate probe receive antenna, and further including the step of steering the two antennas so as to establish a swept null position and determining from the presence of returned energy at a non-null position the direction to the wire from the probe.

6. The method of claim 1, wherein the phase measured is the phase angle between the transmitted signal and the return signal.

7. The method of claim 1, wherein the swept frequency range is between 1.5 to 20 MHz.

8. The method of claim 7, wherein the stepped frequency bins are 50 kilohertz in width.

9. Apparatus for the detection of an object in a surveyed area comprising:
    a frequency stepped swept frequency transmitter for transmitting a stepped series of radio frequency signals each of a different stepped frequency into said area in a frequency swept manner;
    an antenna for receiving returned signals from objects in the surveyed area;
    an S-parameter receiver coupled to said antenna for outputting the amplitude and phase of a returned signal for a predetermined one of said stepped frequency signals;

a frequency/range image generator coupled to said S-parameter receiver for generating for each of the stepped frequencies an image having range on one axis and amplitude and phase on orthogonal axes, such that the pixels of said image have intensities corresponding to the amplitude of the returned signal and the phase angle between the corresponding returned signal and the transmitted signal;

an image storage unit for storing range template images corresponding to the resonance response of the object at various frequencies and ranges from said antenna; and, a correlator for correlating the images generated as a result of returned signals to said antenna and the stored images, said correlator including a module for identifying that stored image that corresponds most closely to the image that is a result of the returned signal, the identity of the stored image indicating the presence of said object and the range of said object to said antenna.

10. The apparatus of claim 9, wherein said object is a wire.

11. The apparatus of claim 10, wherein said stored images include images obtained from a survey of wires of different orientations and lengths.

12. The apparatus of claim 9, and further including an additional antenna coupled to said S-parameter receiver, and further including a phasing unit for phasing said two antennas such that a null direction is established by said phasing unit with respect to a centerline between said two antennas.

13. The apparatus of claim 12, and further including a detector for detecting to which side of said centerline said returns are coming from, thereby to establish a right/left direction of said returned signals.

14. Apparatus for detecting a conductive object including a wire that has a characteristic resonant frequency response to being irradiated with a radio frequency signal comprising:

a transmitter for transmitting frequency stepped radio frequency signals to a surveyed area; and, a conductive object detection module for detecting from returned signals the presence of said wire by detecting the resonant frequency response of said object to said transmitted signals said resonant frequency response being determined by said detection module generating an image from the returned signal and correlating said image with stored image templates.

15. The apparatus of claim 14, wherein said resonant frequency response indicates the length of said object.

16. The apparatus of claim 14, wherein said resonant frequency response indicates the range of said object to said detection module.

17. The apparatus of claim 14, wherein said resonant frequency response indicates the orientation of said object.

18. The apparatus of claim 14, wherein said stored image templates include range templates.

19. The apparatus of claim 18, wherein said stored image templates are generated, one each for each of the stepped frequencies and include pixel densities corresponding to the amplitude of said returned signal and the phase angle between said transmitted stepped frequency signal and said returned signal.

* * * * *